United States Patent
Landes

(10) Patent No.: US 10,130,178 B1
(45) Date of Patent: Nov. 20, 2018

(54) RAIL MOUNT SYSTEMS

(71) Applicant: Mark James Landes, Cheyenne, WY (US)

(72) Inventor: Mark James Landes, Cheyenne, WY (US)

( * ) Notice: Subject to any disclaimer, the term of this patent is extended or adjusted under 35 U.S.C. 154(b) by 0 days.

(21) Appl. No.: 15/019,906

(22) Filed: Feb. 9, 2016

Related U.S. Application Data

(60) Provisional application No. 62/185,481, filed on Jun. 26, 2015, provisional application No. 62/113,914, filed on Feb. 9, 2015.

(51) Int. Cl.
 A47B 96/14 (2006.01)
(52) U.S. Cl.
 CPC ...... *A47B 96/1466* (2013.01); *A47B 96/1416* (2013.01)
(58) Field of Classification Search
 CPC ............ A47B 96/1466; A47B 96/1416; A47B 57/562; A47B 57/565; A47B 57/54; F16B 37/046; F16B 37/045; F16B 7/0446
 See application file for complete search history.

(56) References Cited

U.S. PATENT DOCUMENTS

| | | | | |
|---|---|---|---|---|
| 1,747,496 A | * | 2/1930 | Vanderveld | A47F 5/005 211/184 |
| 2,157,309 A | * | 5/1939 | Swedman | A47B 57/50 248/222.52 |
| 2,345,650 A | * | 4/1944 | Attwood | B62D 33/044 211/182 |
| 2,355,651 A | * | 8/1944 | Hormes | A47B 96/1458 248/220.31 |
| 2,517,308 A | * | 8/1950 | Harrs | B43L 13/048 403/387 |
| 2,788,902 A | * | 4/1957 | Nowicki | A47B 96/028 108/106 |
| 2,928,512 A | * | 3/1960 | Slater | A47B 57/565 248/243 |
| 3,143,981 A | * | 8/1964 | Tassell | A47B 57/54 108/108 |
| 3,180,606 A | * | 4/1965 | Sabin | A47B 57/52 24/DIG. 53 |
| 3,250,584 A | * | 5/1966 | Tassell | A47B 57/565 248/245 |
| 3,476,344 A | * | 11/1969 | Pace | E04F 13/10 248/216.1 |
| 3,826,207 A | * | 7/1974 | Sutherlan | A47B 57/487 108/101 |
| 4,035,097 A | * | 7/1977 | Bachand | F16B 12/32 403/348 |
| 4,143,984 A | * | 3/1979 | Danescu | F16B 7/0446 403/194 |
| 4,212,445 A | * | 7/1980 | Hagen | F16B 12/34 248/222.52 |

(Continued)

*Primary Examiner* — Patrick D Hawn
(74) *Attorney, Agent, or Firm* — Lodestar Patents, PLLC; Raymond J. E. Hall

(57) ABSTRACT

An improved rail mount system which makes it possible to mount new equipment trays onto a component panel without complete disassembly using newly designed hardware. The newly designed hardware makes it possible to lock the nut in place and countersink the screw in such a manner as to prevent the "splitting" or opening of the rail extrusions.

10 Claims, 7 Drawing Sheets

(56) References Cited

U.S. PATENT DOCUMENTS

| | | | | |
|---|---|---|---|---|
| 4,575,295 | A * | 3/1986 | Rebentisch | F16B 37/046 |
| | | | | 411/427 |
| 4,950,099 | A * | 8/1990 | Roellin | B62D 33/044 |
| | | | | 403/348 |
| 5,154,385 | A * | 10/1992 | Lindberg | A47B 57/562 |
| | | | | 248/225.11 |
| 5,208,735 | A | 5/1993 | Twachtmann et al. | |
| 5,372,265 | A | 12/1994 | Monch | |
| 5,669,198 | A * | 9/1997 | Ruff | E06B 1/6015 |
| | | | | 248/222.52 |
| 5,695,078 | A | 12/1997 | Otema | |
| 6,227,756 | B1 * | 5/2001 | Dube | A47B 57/54 |
| | | | | 211/175 |
| 6,322,040 | B1 | 11/2001 | Robertson et al. | |
| 6,410,995 | B1 | 6/2002 | Grouse et al. | |
| 6,549,424 | B1 | 4/2003 | Beseth et al. | |
| 7,070,374 | B2 * | 7/2006 | Womack | B61D 45/001 |
| | | | | 410/104 |
| 7,293,667 | B2 * | 11/2007 | Flynn | A47B 57/565 |
| | | | | 211/187 |
| 7,874,774 | B2 * | 1/2011 | Peterson | B60P 7/0815 |
| | | | | 410/104 |
| 8,277,158 | B2 * | 10/2012 | Csik | F16B 37/046 |
| | | | | 411/111 |
| 8,353,649 | B2 * | 1/2013 | Csik | F16B 37/045 |
| | | | | 411/108 |
| 8,550,757 | B2 * | 10/2013 | Anderson | B60P 7/0815 |
| | | | | 410/102 |
| 9,046,212 | B2 * | 6/2015 | Harris | A47F 5/105 |
| 9,103,365 | B2 * | 8/2015 | Whipple | F16B 37/00 |
| 9,395,042 | B2 * | 7/2016 | Harris | A47F 5/105 |
| 2011/0132853 | A1 * | 6/2011 | Drobot | A47B 57/562 |
| | | | | 211/42 |

\* cited by examiner

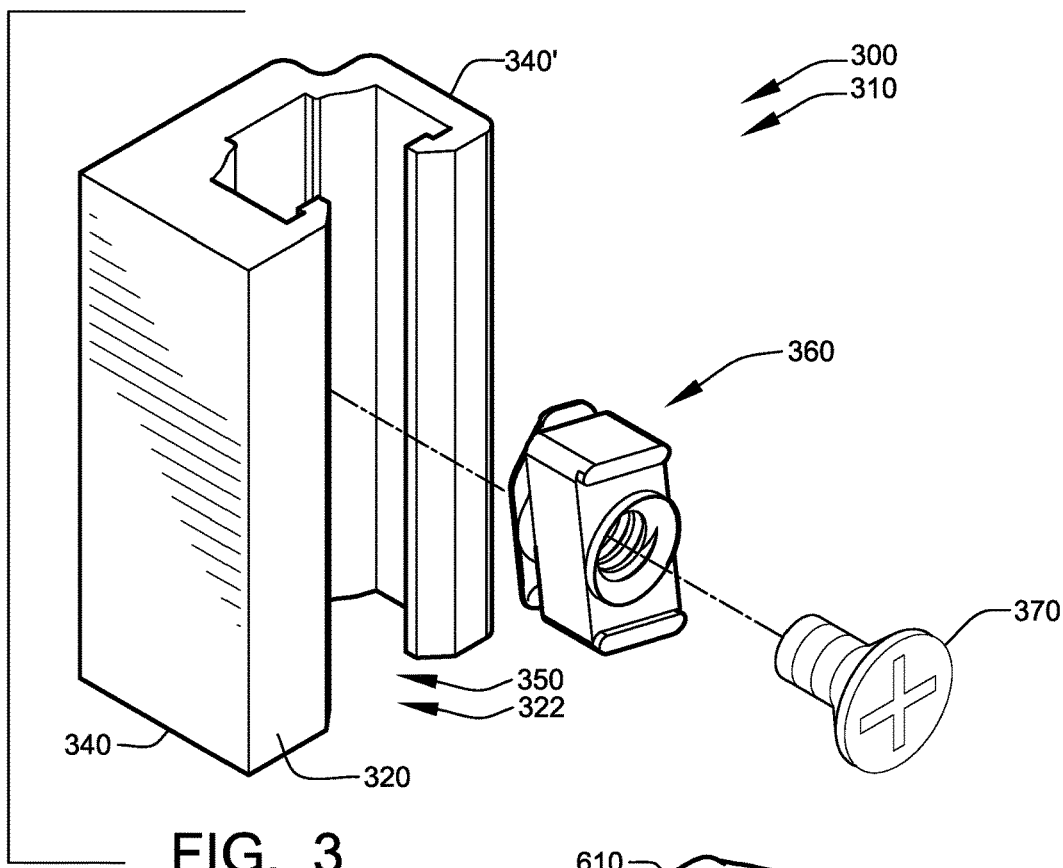
FIG. 3
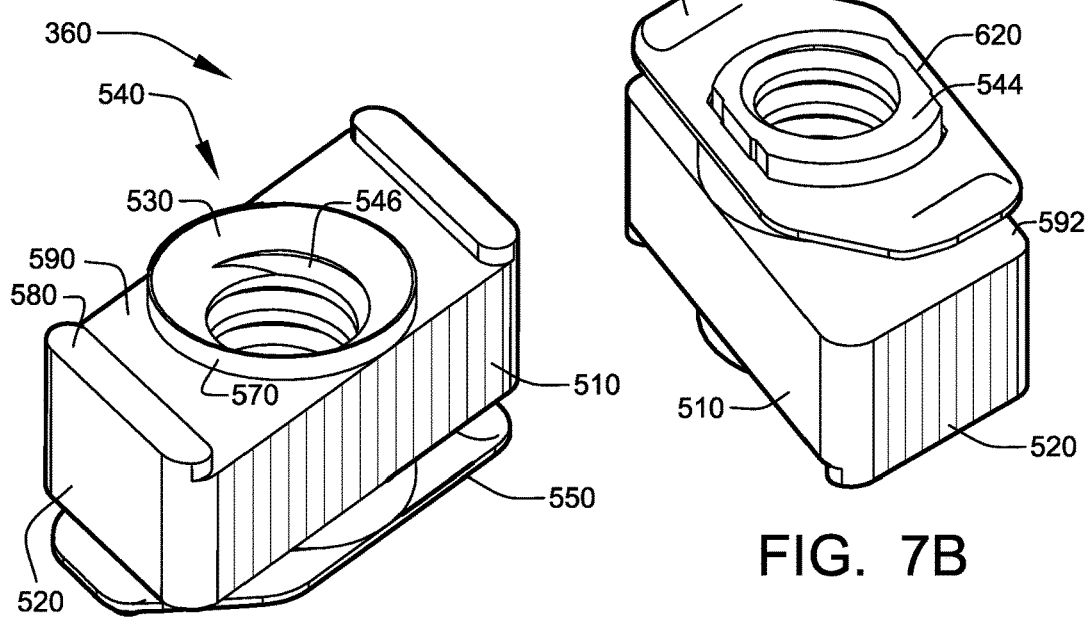
FIG. 7A
FIG. 7B

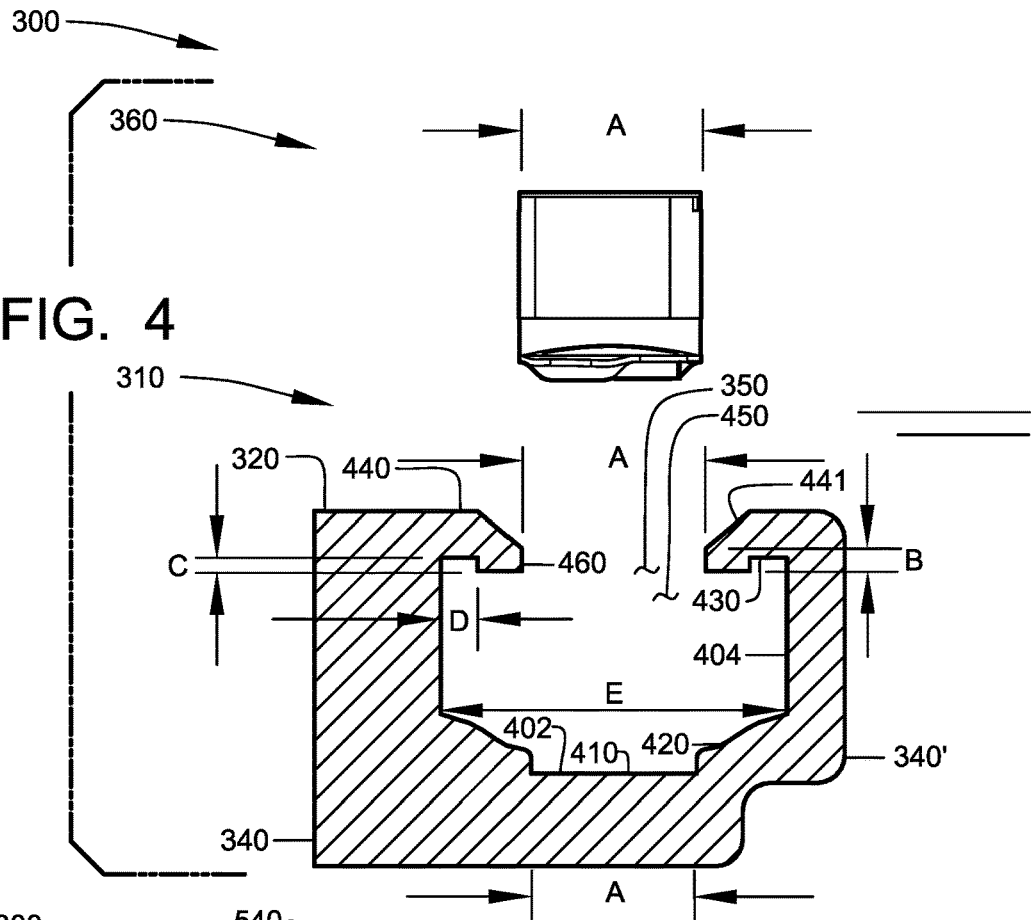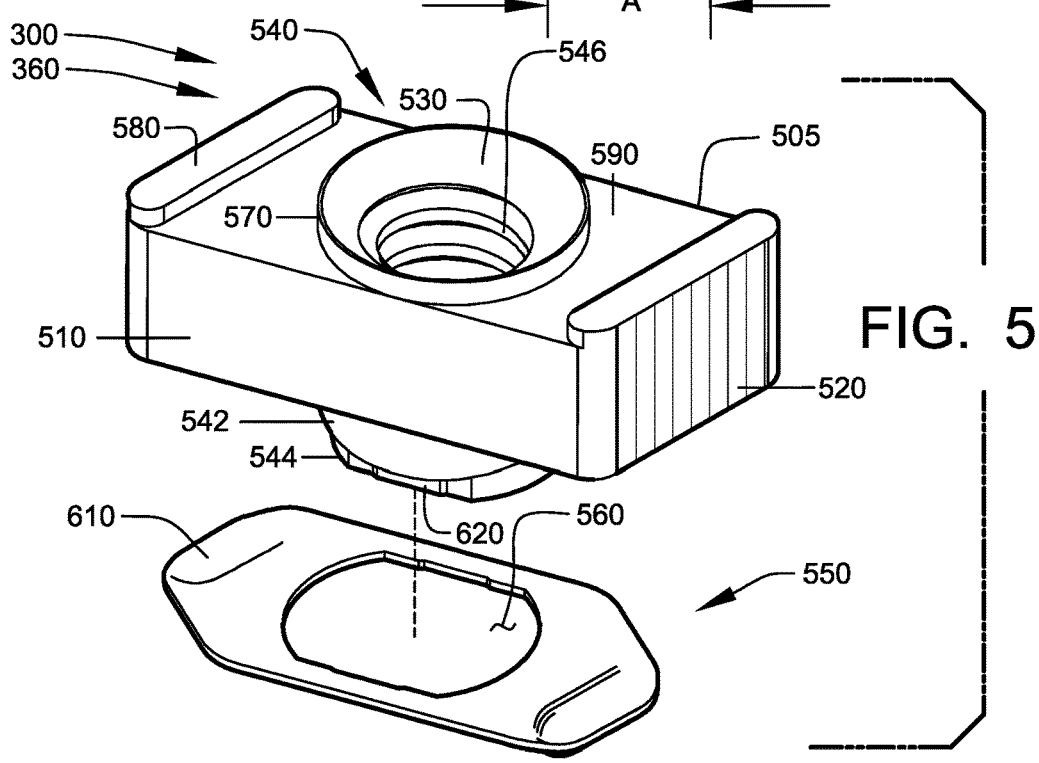

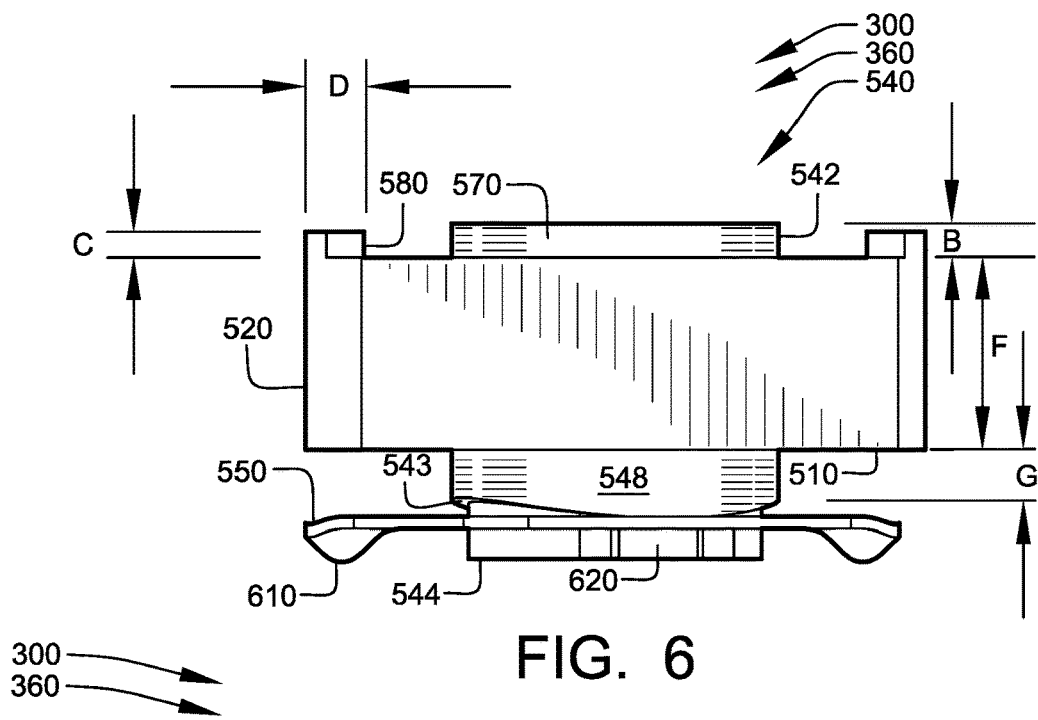
FIG. 6
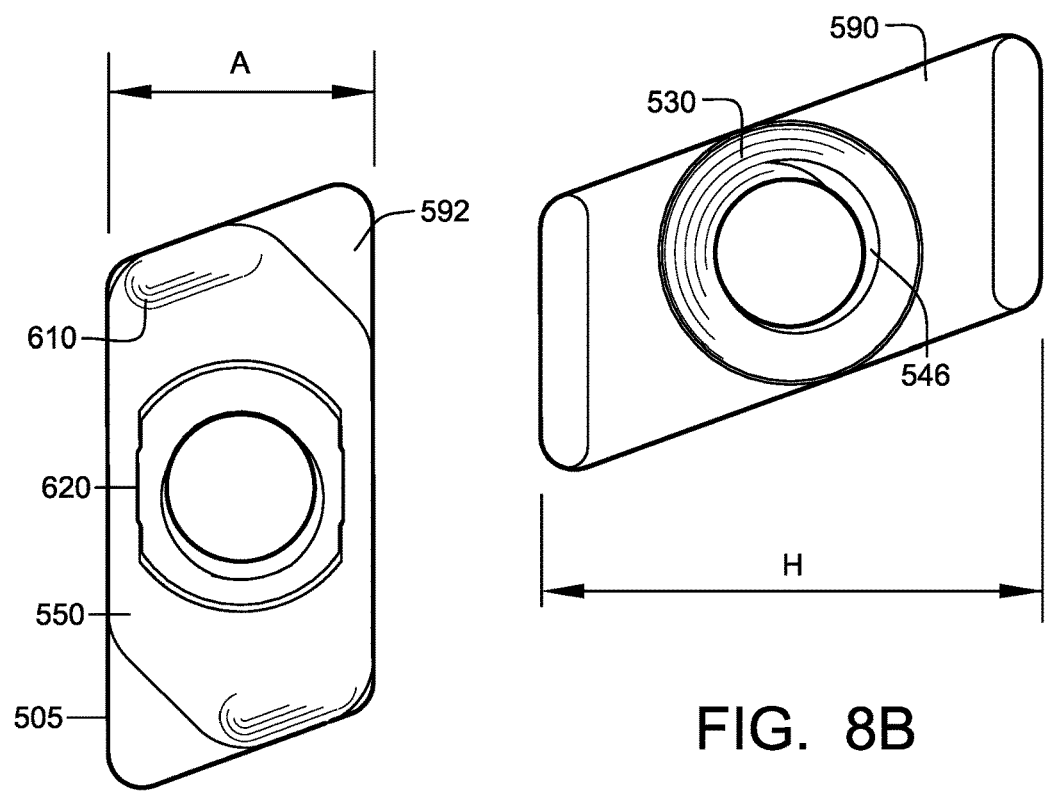
FIG. 8A
FIG. 8B

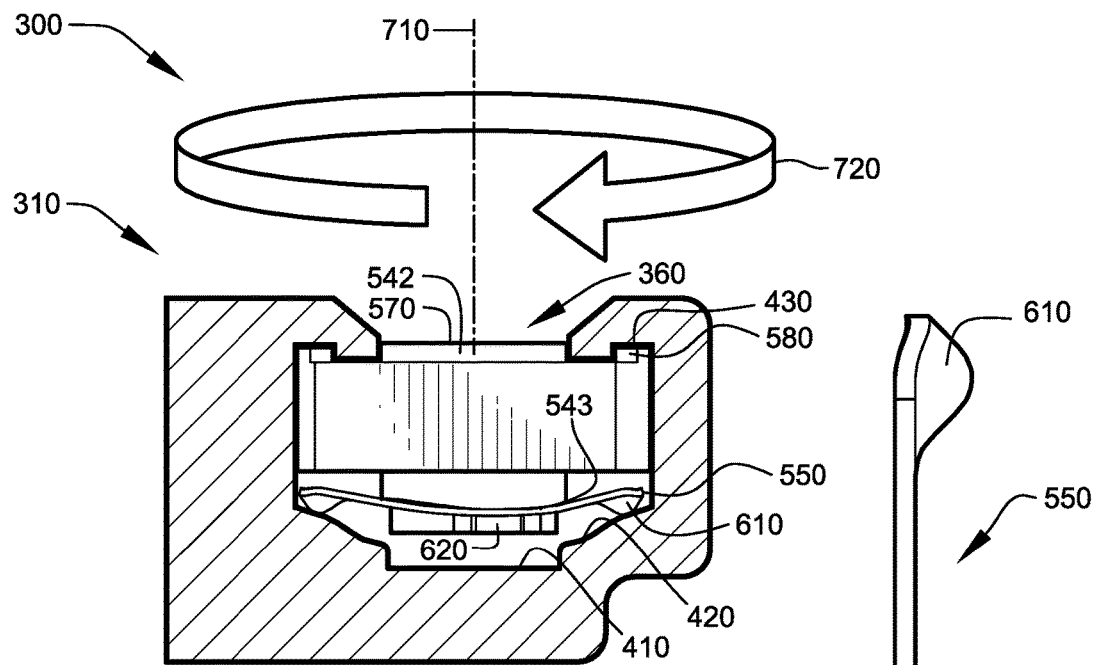
FIG. 11
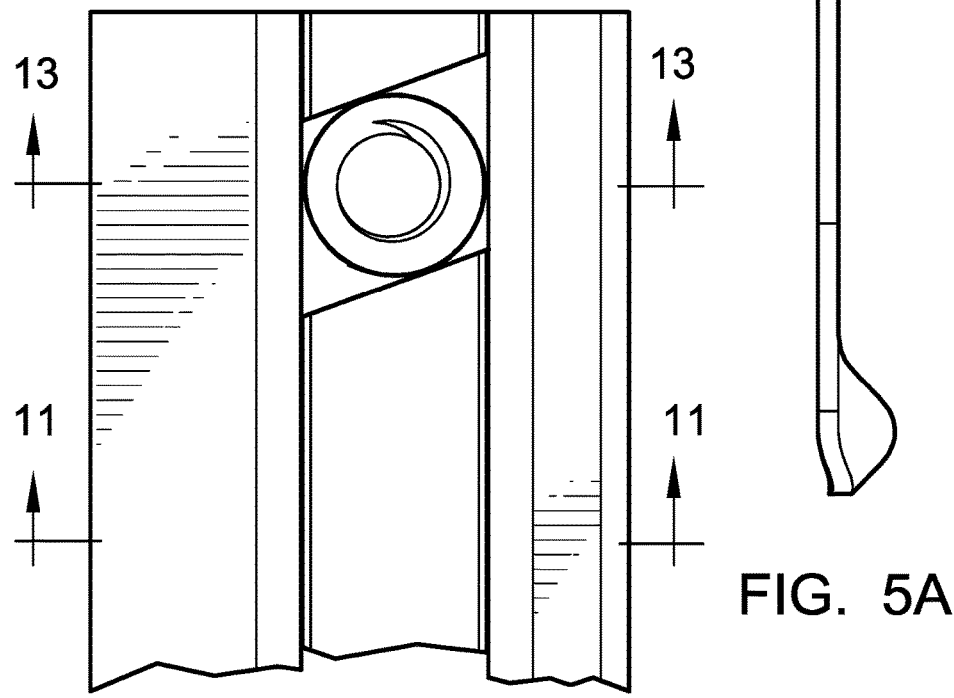
FIG. 12
FIG. 5A

US 10,130,178 B1

RAIL MOUNT SYSTEMS

CROSS-REFERENCE TO RELATED APPLICATION

The present application is related to and claims priority from prior provisional application Ser. No. 62/113,914, filed Feb. 9, 2015, entitled "RAIL MOUNT SYSTEMS"; and, this application is related to and claims priority from prior provisional application Ser. No. 62/185,481, filed Jun. 26, 2015, entitled "RAIL MOUNT SYSTEMS", the contents of both of which are incorporated herein by this reference and are not admitted to be prior art with respect to the present invention by the mention in this cross-reference section.

BACKGROUND

This invention relates to providing a system for improved rail mount systems. More particularly this invention relates to providing a system for mounting of equipment using rails and nuts. Such equipment may be avionics, computer equipment, or any other application where component equipment needs to be stacked together within a relatively small space. Primary problems with other rail mounting systems include the need to pre-load all hardware assemblies into the rail prior to installation of the rail into the instrument panel. This is due to the fact that hardware assemblies can only be loaded into the rail from the end. Hardware assemblies are difficult to load into the rail, and component alignment problems can often occur which result in the hardware assembly binding in the rail rack. Additionally, with other systems, if new equipment components need to be added to the instrument panel, or a component needs to be replaced, it requires complete disassembly and reassembly.

In addition to the above mentioned problems, tightening the screws to lock the trays to the tray rails causes the rail extrusions to tend to "split" or open up. This condition is mitigated in the current systems by adding material to the extrusion cross-section, making it "beefier". This results in rails that are heavier.

OBJECTS AND FEATURES OF THE INVENTION

A primary object and feature of the present invention is to provide a system overcoming the above-mentioned problem. More specifically, it is an object and feature of the present invention to provide a system that is infinitely adjustable and re-usable.

It is a further object and feature of the present invention to provide such a system which allows for hardware and components to be added to equipment panels without complete disassembly.

A further primary object and feature of the present invention is to provide a system that is structurally sound and capable of supporting increasingly heavy equipment components without additional rear support.

A further primary object and feature of the present invention is to provide a system that may be installed and employed in a wide variety of applications.

Yet another object and feature of the present invention is to provide a system that provides user-selected system adjustability.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to mounting multiple components into an equipment panel, comprising: at least one mounting-rail structured and arranged to mount the components into the equipment panel; and at least one fastener coupler structured and arranged to couple at least one fastener and such at least one mounting-rail; wherein such at least one fastener is structured and arranged to fasten the components to such at least one mounting-rail; wherein such at least one mounting-rail comprises at least one first component-mount engager structured and arranged to engage at least one mount of the components; wherein, when such at least one fastener is tightened, such at least one mount exerts at least one spreading force upon such at least one mounting-rail; wherein such at least one fastener coupler comprises at least one rail-spread restrictor structured and arranged to restrict spread of such at least one mounting-rail from such at least one spreading force; and wherein such at least one mounting-rail comprises at least one continuous slider structured and arranged to permit sliding of such at least one fastener coupler along such at least one mounting-rail continuously between both ends.

Moreover, it provides such a system wherein such at least one mounting-rail further comprises at least one fastener-coupler acceptor structured and arranged to accept insertion of such at least one fastener coupler into such at least one mounting-rail. Additionally, it provides such a system wherein such at least one mounting-rail further comprises: at least one end and at least one side; wherein such at least one fastener-coupler acceptor accepts insertion of such at least one fastener into such at least one mounting-rail through such at least one side.

Also, it provides such a system wherein such at least one fastener coupler further comprises at least one gravity resister structured and arranged to resist gravity-induced sliding of such at least one fastener coupler along such at least one mounting-rail. In addition, it provides such a system wherein such at least one gravity resister comprises at least one friction-force sustainer structured and arranged to sustain a frictional force sufficient to resist such gravity-induced sliding.

And, it provides such a system wherein such at least one mounting-rail further comprises at least one frictional-force creator structured and arranged to create such frictional force sustained by such at least one frictional-force sustainer. Further, it provides such a system wherein such at least one friction-force sustainer comprises at least one spring. Even further, it provides such a system wherein such at least one frictional-force creator comprises: at least one friction-force sustainer-engager structured and arranged to engage such at least one friction-force sustainer to create a frictional force between such at least one fastener coupler and such at least one mounting-rail; wherein such at least one friction-force sustainer-engager comprises at least one slope. Moreover, it provides such a system wherein such at least one friction-force sustainer engages such at least one friction-force sustainer-engager upon rotation of such at least one fastener coupler in such at least one mounting-rail.

Additionally, it provides such a system wherein such at least one spring comprises a parallelogram. Also, it provides such a system wherein such fastener coupler further comprises at least one rotational engager structured and arranged to engage such at least one mounting-rail by rotation of such at least one fastener coupler. In addition, it provides such a system wherein such at least one rotational engager comprises at least one rotational biaser structured and arranged to bias the direction of the rotation of such at least one rotational engagement. And, it provides such a system wherein such at least one rotational biaser biases the rotation as clockwise rotation.

Further, it provides such a system wherein such at least one fastener coupler further comprises a parallelogram. Even further, it provides such a system wherein such parallelogram of such at least one fastener coupler restricts such at least one fastener coupler to rotate less than 90 degrees.

Moreover, it provides such a system further comprising: at least one rail coupler structured and arranged to couple such at least one mounting-rail with such at least one fastener coupler; wherein such at least one mounting-rail comprises at least one rail-portion of such at least one rail coupler; wherein such at least one fastener coupler comprises at least one fastener-coupler portion of such at least one rail coupler; and wherein such rail portion and such fastener-coupler portion interlock to engage coupling between such at least one mounting-rail and such at least one fastener coupler. Additionally, it provides such a system wherein such at least one fastener coupler further comprises at least one second component-mount engager structured and arranged to engage such at least one mount of the components. Also, it provides such a system wherein such at least one first component-mount engager and such at least one second component-mount engager are symmetrically aligned. In addition, it provides such a system wherein such at least one first component-mount engager and such at least one second component-mount engager comprise at least one chamfer. And, it provides such a system wherein such at least one chamfer comprises 100 degree chamfer.

Further, it provides such a system wherein such at least one fastener coupler further comprises at least one rail-structural reinforcer structured and arranged to reinforce, when such at least one fastener is tightened, the structural integrity of such at least one mounting-rail. Even further, it provides such a system wherein, when the structural integrity of such at least one mounting-rail is reinforced by such at least one rail-structural reinforcer, at least one portion of such at least one mounting-rail coupled with such at least one fastener coupler comprises at least one box-beam structure.

In accordance with another preferred embodiment hereof, this invention provides a system, relating to mounting multiple components into an equipment panel, comprising: at least one mounting-rail structured and arranged to mount the components into the equipment panel; and fastener coupler means for coupling at least one fastener and such at least one mounting-rail; wherein such at least one fastener is structured and arranged to fasten the components to such at least one mounting-rail; wherein such at least one mounting-rail comprises first component-mount engager means for engaging at least one mount of the components; wherein, when such at least one fastener is tightened, such at least one mount exerts at least one spreading force upon such at least one mounting-rail; wherein such fastener coupler means comprises rail-spread restrictor means for restricting spread of such at least one mounting-rail from such at least one spreading force; and wherein such at least one mounting-rail comprises continuous slider means for permitting sliding of such at least one fastener coupler means along such at least one mounting-rail continuously between both ends. Moreover, it provides such a system wherein such at least one mounting-rail further comprises fastener-coupler acceptor means for accepting insertion of such fastener coupler means into such at least one mounting-rail.

Additionally, it provides such a system wherein such fastener coupler means further comprises gravity resister means for resisting gravity-induced sliding of such fastener coupler means along such at least one mounting-rail. Also, it provides such a system wherein such gravity resister means comprises friction-force sustainer means for sustaining a frictional force sufficient to resist such gravity-induced sliding. In addition, it provides such a system wherein such at least one mounting-rail further comprises frictional-force creator means for creating such frictional force sustained by such frictional-force sustainer means. And, it provides such a system wherein such at least one friction-force sustainer means engages such at least one friction-force sustainer-engager means upon rotation of such at least one fastener coupler in such at least one mounting-rail.

Further, it provides such a system wherein such fastener coupler means further comprises rotational engager means for engaging such at least one mounting-rail by rotation of such fastener coupler means. Even further, it provides such a system wherein such rotational engager means comprises rotational biaser means for biasing the direction of the rotation of such rotational engagement means. Moreover, it provides such a system wherein such rotational biaser means biases the rotation as clockwise rotation.

Additionally, it provides such a system further comprising: rail coupler means for coupling such at least one mounting-rail with such fastener coupler means; wherein such at least one mounting-rail comprises at least one rail-portion of such rail coupler means; wherein such fastener coupler means comprises at least one fastener-coupler portion of such rail coupler means; and wherein such rail portion and such fastener-coupler portion interlock to engage coupling between such at least one mounting-rail and such fastener coupler means.

Also, it provides such a system wherein such fastener coupler means further comprises second component-mount engager means for engaging such at least one mount of the components. In addition, it provides such a system wherein such first component-mount engager means and such second component-mount engager means are symmetrically aligned. And, it provides such a system wherein such fastener coupler means further comprises rail-structural reinforcer means for reinforcing, when such at least one fastener is tightened, the structural integrity of such at least one mounting-rail.

In accordance with another preferred embodiment hereof, this invention provides a system, relating to mounting components into an equipment panel, comprising: at least one mounting-rail structured and arranged to mount the components into the equipment panel; and at least one nut structured and arranged to couple at least one fastener and such at least one mounting-rail; wherein such at least one fastener is structured and arranged to fasten the components to such at least one mounting-rail; wherein such at least one mounting-rail comprises at least one first component-mount engager structured and arranged to engage at least one mount of the components; wherein, when such at least one fastener is tightened, such at least one mount exerts at least one spreading force upon such at least one mounting-rail; wherein such at least one nut comprises at least one rail-spread restrictor structured and arranged to restrict spread of such at least one mounting-rail from such at least one spreading force; wherein such at least one mounting-rail comprises at least one continuous slider structured and arranged to permit sliding of such at least one nut along such at least one mounting-rail continuously between both ends; wherein such at least one nut comprises at least one gravity resister structured and arranged to resist gravity-induced sliding of such at least one nut along such at least one mounting-rail; wherein such at least one gravity resister comprises at least one spring; wherein such at least one gravity resister comprises at least one slope; wherein such at least one spring engages such at least one slope upon rotation of such at least one nut; wherein such at least one nut further comprises at least one rotational engager to engage such at least one mounting-rail by rotation of such at least one nut; wherein such at least one rotational engager comprises at least one rotational biaser structured and arranged to bias the rotation of such at least one rotational engagement; wherein such at least one rotational biaser biases the rotation as clockwise rotation; at least one rail coupler structured and arranged to couple such at least one mounting-rail with such at least one nut; wherein such at least one nut comprises at least one nut-portion of such at least one rail coupler; wherein such at least one mounting rail comprises at least one rail-portion of such at least one rail coupler; wherein such rail-portion and such nut-portion interlock to engage coupling between such at least one mounting-rail and such at least one nut; wherein such at least one rail coupler further comprises such at least one rail-spread restrictor; wherein such at least one fastener coupler further comprises at least one rail-structural reinforcer structured and arranged to reinforce, when such at least one rail fastener is tightened, the structural integrity of such at least one mounting-rail; and wherein, when the structural integrity of such at least one mounting-rail is reinforced by such at least one rail-structural reinforcer, at least one portion of such at least one mounting-rail coupled with such at least one fastener coupler comprises at least one box-beam structure. Each and every novel feature, element, combination, step and/or method disclosed or suggested by this patent application.

BRIEF DESCRIPTION OF THE DRAWINGS

FIG. 3 shows an exploded view of a preferred mounting rail and nut assembly according to a preferred embodiment of the present invention.

FIG. 4 shows a side view of a preferred mounting rail and nut assembly according to the preferred embodiment of FIG. 3.

FIG. 5 shows an exploded perspective view of the nut assembly according to the preferred embodiment of FIG. 3.

FIG. 5A shows a side view of the nut tension spring according to the preferred embodiment of FIG. 5.

FIG. 6 shows a side elevational view of the nut assembly according to the preferred embodiment of FIG. 3.

FIG. 7A shows a perspective top view, illustrating a nut assembly, according to the preferred embodiment of FIG. 3.

FIG. 7B shows a perspective bottom view, illustrating a nut assembly, according to the preferred embodiment of FIG. 3.

FIG. 8A shows a bottom view of the nut assembly according to the preferred embodiment of FIG. 3.

FIG. 8B shows a top view of the nut assembly according to the preferred embodiment of FIG. 3.

FIG. 11 shows the sectional view 11-11 of FIG. 12 of the rail with the nut inserted in the locked position, according to the preferred embodiment of FIG. 3.

FIG. 12 shows a partial top view of the rail with the nut inserted in the locked position, according to the preferred embodiment of FIG. 3.

DETAILED DESCRIPTION OF THE BEST MODES AND PREFERRED EMBODIMENTS OF THE INVENTION

This invention relates to providing a system for improved rail mount systems. More particularly this invention relates to providing a system for mounting of equipment using rails and nuts.

Primary problems with other rail mounting systems include the need to pre-load all hardware assemblies into the rail prior to installation of the rail into the instrument panel. An additional problem with other rail systems is rail "spreading" or opening up of the rail extrusions when the nuts are locked in place and the screws are countersunk. This invention has solved these problems with modifications to the rail extrusions and the hardware which make it possible to mount new equipment trays without complete disassembly. Furthermore, the newly designed hardware makes it possible to lock the nut in place and countersink the screw in such a manner so as to prevent the "splitting" or opening of the rail extrusions. This makes the rail stronger without having to add any additional material, thus allowing it to be lighter overall.

Figure 1:
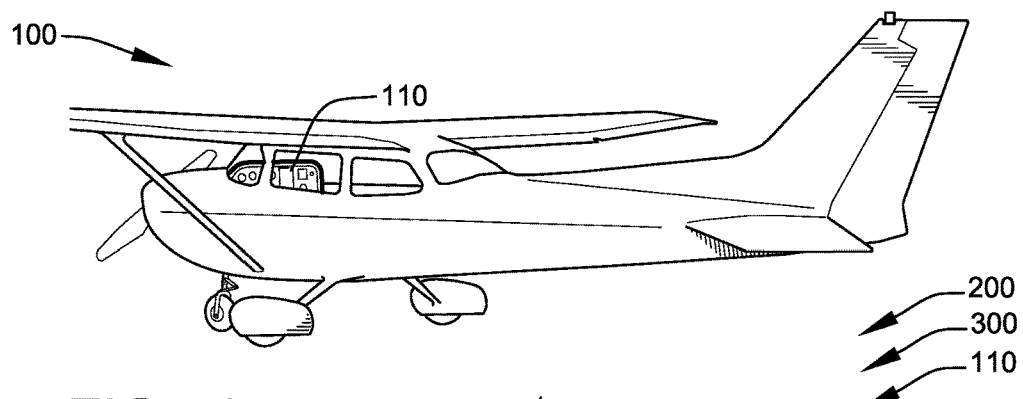
FIG. 1 shows an artistic rendering of a general aviation aircraft.

Such equipment may be avionics, computer equipment, or any other application where component equipment needs to be stacked together within a relatively small space. For purposes of illustration, the present discussion focuses on application of the system in avionics. FIG. 1 shows an artistic rendering of a general aviation aircraft system 100 with a cockpit instrument panel 110.

Figure 2:
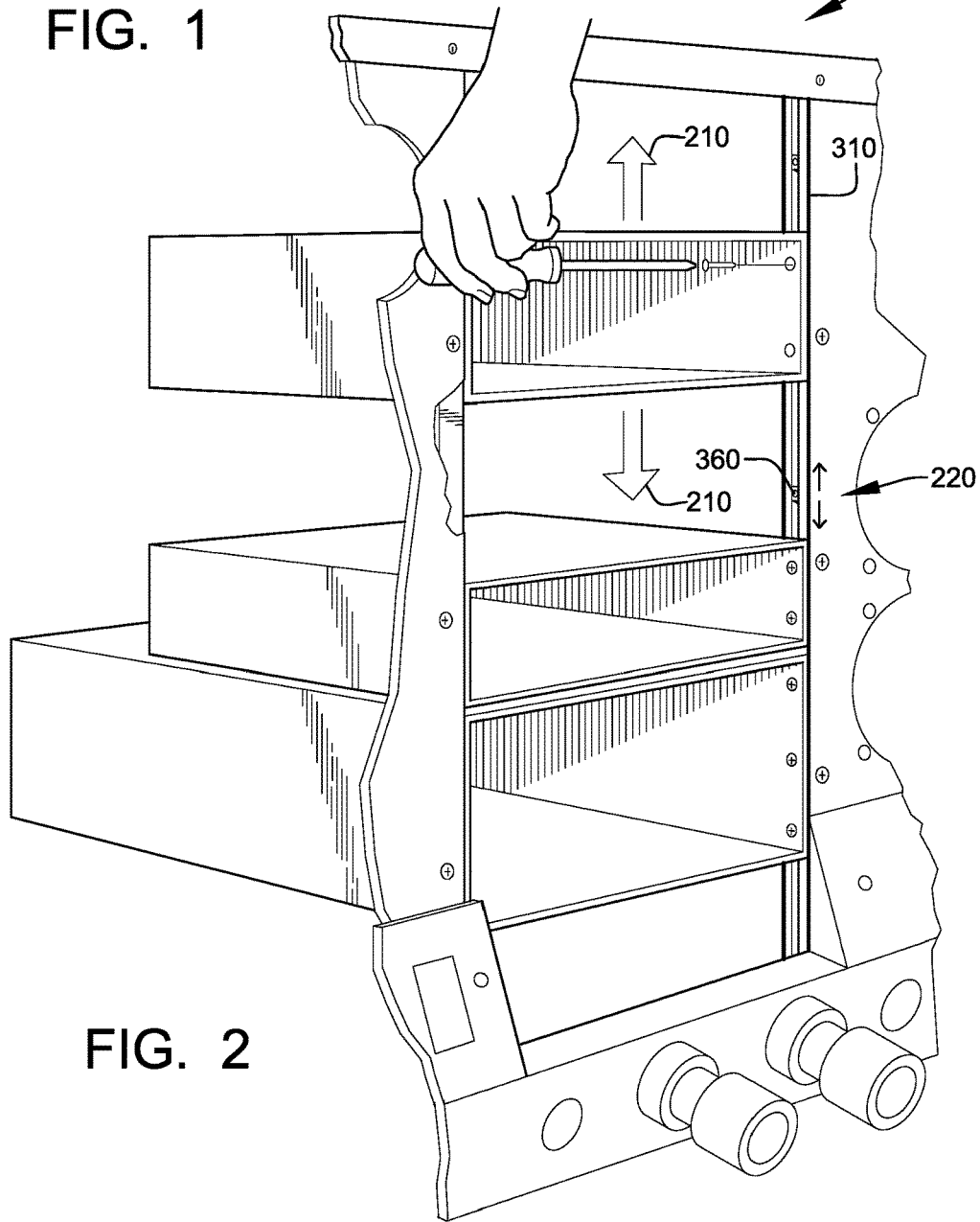
FIG. 2 shows a schematic illustration of a preferred rack component.

FIG. 2 is a schematic illustration of a preferred rack component 200 of a cockpit instrument panel 110 of rail mount system 300. FIG. 2 depicts how use of rail mount system 300 allows for an installer to place at least one nut assembly 360 at any place along at least one mounting-rail 310, by sliding the nut assembly 360 to any position along mounting-rail 310 (as seen with directional arrows 220), as shown. Directional arrows 210 depict that due to the ability to move nut assembly 360 to any position along mounting-rail 310, an installer can place component equipment at any position along mounting-rail 310, as shown.

FIG. 3 shows an exploded view of a preferred mounting-rail 310 and nut assembly 360, according to a preferred embodiment of rail mount system 300. Rail mount system 300 preferably comprises at least one mounting-rail 310 (at least herein embodying at least one mounting-rail structured and arranged to mount the components into the equipment panel), as shown. Mounting-rail 310 preferably comprises metal, preferably aluminum, preferably extruded aluminum.

Mounting-rail preferably comprises at least one first surface 320, at least one second surface 330, at least one first side 340 and at least one second side 340'. Second surface 330 is preferably essentially parallel to first surface 320, as shown. Mounting-rail 310 preferably comprises at least one nut channel 350. Nut channel 350 preferably intersects first surface 320 to preferably form at least one continuous channel opening 322 (at least herein embodying wherein said at least one mounting-rail further comprises at least one fastener-coupler acceptor structured and arranged to accept insertion of said at least one fastener coupler into said at least one mounting rail; and at least herein embodying wherein said fastener coupler means further comprises fastener-coupler acceptor means for accepting insertion of said fastener coupler means into said at least one mounting-rail). Rail mount system 300 preferably comprises at least one nut assembly 360 (at least embodying herein at least one fastener coupler structured and arranged to couple at least one fastener and said at least one mounting-rail; and at least embodying herein fastener coupler means for coupling at least one fastener and said at least one mounting rail) which can preferably be inserted into nut channel 350 (at least herein embodying wherein said at least one mounting-rail further comprises: at least one end and one side; and at least herein embodying wherein said at least one fastener-coupler acceptor accepts insertion of said at least one fastener through said at least one mounting rail in said at least one side), as shown. Rail mount system 300 preferably further comprises at least one fastener 370 (at least herein embodying wherein, such at least one fastener is structured and arranged to fasten the components to said at least one mounting-rail), as shown.

FIG. 4 shows a side view of a preferred mounting-rail 310 and nut assembly 360 according to the preferred embodiment of FIG. 3. Mounting-rail 310 preferably comprises an essentially rectangular cross-section. However, in order to strengthen mounting-rail, nut channel 350 is preferably shifted toward side 340', resulting in a slightly irregular shape to side 340', as shown. Nut channel 350 preferably intersects first surface 320, preferably to form a continuous channel opening 322 (at least herein embodying wherein said at least one mounting-rail comprises at least one continuous slider structured and arranged to permit sliding of said at least one fastener coupler along said at least one mounting-rail continuously between both ends; and at least herein embodying wherein said at least one mounting rail comprises continuous slider means for permitting sliding of said at least one fastener coupler means along said at least one mounting-rail continuously between both ends) along first surface 320 (see FIG. 3). Nut channel 350 comprises a mouth opening of width A which is equal to the width A of about 7/32 inch of nut assembly 360.

Nut channel 350 preferably comprises at least one channel back face 402 which preferably assists in retaining nut assembly 360 inside mounting-rail 310, as shown. Nut channel 350 preferably comprises at least two channel side faces 404 which preferably assist in retaining nut assembly 360 inside mounting-rail 310, as shown. Nut channel 350 preferably comprises at least one retaining flange 440 preferably opposed from (positioned opposite from) said at least one channel back face 402 which preferably assists in retaining nut assembly 360 inside mounting-rail 310, as shown.

Retaining flange 440 preferably comprises a "hooked" shape. Retaining flange 440 of mounting-rail 310 preferably extends to each side of the opening of nut channel 350, as shown. Retaining flange 440 is preferably structured and arranged to engage at least one mount of the components (at least herein embodying wherein said at least one mounting-rail comprises at least one first component-mount engager structured and arranged to engage at least one mount of the components; and at least herein embodying wherein said at least one mounting-rail comprises first component-mount engager means for engaging at least one mount of the components). Retaining flange 440 preferably comprises at least one surface 441, preferably at least one chamfered surface (at least herein embodying wherein said at least one first component-mount engager and said at least one second component-mount engager comprise at least one chamfer; and at least herein embodying wherein said at least one chamfer comprises 100 degree chamfer).

Retaining flange 440 preferably further comprises at least one terminal edge 460. Terminal edge 460 preferably comprises vertical surface. Vertical surface comprises a height B of about 1/32 inch, as shown.

Channel side faces 404 of nut channel 350 preferably extend upward into retaining flange 440 by a distance C of about 1/64 inch, which preferably create at least one nut-locking groove 430 (at least herein embodying wherein said at least one mounting-rail comprises at least one rail-portion of said at least one rail coupler; and at least herein embodying wherein said at least one mounting-rail comprises at least one rail-portion of said rail coupler means), as shown. Nut channel 350 preferably further comprises at least one interior cavity 450 within which nut assembly 360 can be inserted. Nut-locking groove 430 preferably comprises a width D between the interior sides of interior cavity 450 and the interior side of retaining flange 440, as shown.

Nut channel 350 is preferably sufficiently deep and wide to accommodate nut assembly 360. Interior cavity 450 of nut channel 350 preferably comprises a width E of about 3/8 inch, as shown. The base of interior cavity 450 preferably comprises at least one nut groove 410, as shown. Nut groove 410 preferably comprises width A which is essentially equal to the width A of the mouth opening of nut channel 350 and the width A of nut assembly 360. Channel side faces 404 of interior cavity 450 preferably comprise at least one channel-spring slope 420 (at least herein embodying wherein said at least one mounting-rail further comprises at least one frictional-force creator structured and arranged to create such frictional force sustained by said at least one frictional-force sustainer; and at least herein embodying wherein said at least one frictional-force creator comprises at least one slope; and at least herein embodying wherein said at least one mounting-rail further comprises frictional-force creator means for creating such frictional force sustained by said frictional-force sustainer means). Channel-spring slope 420 preferably slopes upward from channel back face 402 toward the channel side faces 404 of interior cavity 450 as shown. Channel-spring slope 420 preferably aids in locking nut assembly 360 within nut channel 350, as further discussed below.

FIG. 5 shows an exploded perspective view of nut assembly 360 and nut tension-spring 550 (at least herein embodying wherein said at least one gravity resister comprises at least one friction-force sustainer structured and arranged to sustain a frictional force sufficient to resist such gravity-induced sliding; and at least herein embodying wherein said gravity resister means comprises friction-force sustainer means for sustaining a frictional force sufficient to resist such gravity-induced sliding) according to the preferred embodiment of FIG. 3. FIG. 5A shows a side view of the nut tension-spring 550 according to the preferred embodiment of FIG. 5. FIG. 6 shows a side elevational view of nut assembly 360 according to the preferred embodiment of FIG. 3. FIG. 7A shows a perspective top view, illustrating nut assembly 360, according to the preferred embodiment of FIG. 3. FIG. 7B shows a perspective bottom view, illustrating the nut assembly 360, according to the preferred embodiment of FIG. 3. FIG. 8A shows a bottom view of the nut assembly 360 according to the preferred embodiment of FIG. 3. FIG. 8B shows a top view of the nut assembly 360 according to the preferred embodiment of FIG. 3.

Referring to FIG. 8A, nut assembly 360 preferably comprises at least one parallelogram shape (at least herein embodying wherein said at least one fastener coupler comprises parallelogram; and at least herein embodying wherein said at least one rotational engager comprises at least one rotational biaser structured and arranged to bias the direction of the rotation of said at least one rotational engagement; and at least herein embodying wherein said rotational engager means comprises rotational biaser means for biasing the direction of the rotation of said rotational engagement means) having a width A (see FIG. 8A) which is equal to the width A of the opening of nut channel 350 (See FIG. 4). The parallelogram shape of nut assembly 360 preferably biases nut assembly 360 to turn in a clockwise manner (at least herein embodying wherein said at least one rotational biaser biases the rotation as clockwise rotation; and at least herein embodying wherein said rotational biaser means biases the rotation as clockwise rotation), as discussed below. Referring to FIG. 5, nut assembly 360 preferably comprises at least one side surface 510 and at least one end surface 520, preferably two side surfaces 510 and two end surfaces 520. Nut assembly 360 preferably further comprises at least one top surface 590, as shown. Nut assembly 360 further comprises at least one bottom surface 592 (see FIG. 7B). The combination of side surfaces 510, end surfaces 520, top surface 590 and bottom surface 592 of nut assembly 360 preferably form at least one nut platform 505, as shown. The edges of nut platform 505, which coincide with end surfaces 520 preferably further comprise at least one nut-interlock aligner 580 (at least herein embodying wherein said at least one fastener coupler comprises at least one fastener-coupler portion of said at least one rail coupler; and at least herein embodying wherein said fastener coupler means comprises at least one fastener-coupler portion of said rail coupler means), as shown. Nut-interlock aligners 580 preferably comprise extensions of side surfaces 520 which protrude above top surface 590 to a height C (See FIG. 6) which is equal to height C of nut-locking groove 430 (see FIG. 4). The outer edges of the nut-interlock aligners 580 and nut platform 505 preferably comprise rounded corners to assist in allowing nut assembly 360 to turn smoothly inside mounting-rail 310 to lock it, as discussed below.

The center of nut assembly 360 preferably comprises at least one nut fastener-receptor 540 for accepting at least one fastener 370, preferably at least one screw (See FIG. 3). Nut fastener-receptor 540 preferably comprises a "tubular" structure which preferably transects the thickness of nut platform 505, as seen in FIGS. 5 and 6. Nut fastener-receptor 540 preferably comprises at least one fastener-receptor 542 and at least one tension-spring-receptor 544, as seen in FIGS. 5 and 6.

Fastener-receptor 542 of nut fastener-receptor 540 preferably protrudes above top surface 590 and preferably forms screw-chamfer collar 570 (see FIG. 6). Screw-chamfer collar 570 is preferably structured and arranged to engage at least one mount of the components (at least herein embodying wherein said at least one fastener coupler further comprises at least one second component mount engager structured and arranged to engage such at least one mount of the components; and at least herein embodying wherein said fastener coupler means further comprises second component-mount engager means for engaging such at least one mount of the components). Screw-chamfer collar 570 preferably protrudes above top surface 590 of nut platform 505 to a height B (see FIG. 6) which is equal to height B of terminal edge 460 of retaining flange 440 of mounting-rail 310 (see FIG. 4). The tubular structure of fastener-receptor 542 preferably extends through nut platform 505 and preferably extends below bottom surface 592 of nut platform 505 to a depth G of about 1/16 inch (see FIG. 6).

Screw-chamfer collar 570 preferably comprises at least one collared surface 530, preferably a chamfered surface. When nut assembly 360 is preferably inserted into mounting-rail 310, and preferably locked into place, the collared surface 530 of nut assembly 360 and the surface 441 of retaining flange 440 of mounting-rail 310 preferably become aligned with one another (at least herein embodying wherein said at least one first component-mount engager and said at least one second component-mount engager are symmetrically aligned; and at least herein embodying wherein said first component-mount engager means and said second component-mount engager means are symmetrically aligned), as discussed below.

Figure 13:
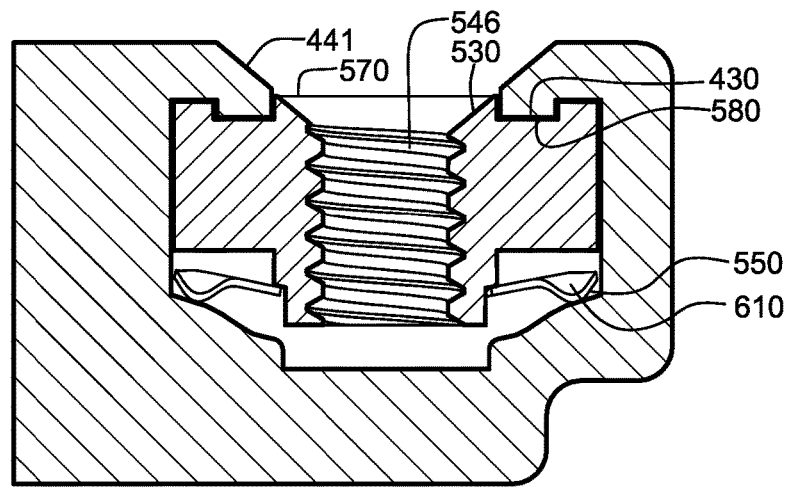
FIG. 13 shows the sectional view 13-13 of FIG. 12 of the rail with the nut inserted in the locked position, according to the preferred embodiment of FIG. 3.

Fastener-receptor 542 of nut fastener-receptor 540 preferably further comprises at least one threading 546 (See FIGS. 5 and 13). Preferably threading 546 preferably comprises clockwise threading (see FIG. 8B). Fastener-receptor 542 preferably further comprises an outer surface 548, as shown. Outer surface 548 comprises a smooth surface (see FIG. 6).

The lower edge of fastener-receptor 542 preferably comprises at least one curved lip 543. Curved lip 543 is preferably curved such that the portion of fastener-receptor 542 which coincides with end surfaces 520 is higher than the portion of fastener-receptor 542 which coincides with side surfaces 510 of nut platform 505 (see FIG. 6).

Nut fastener-receptor, preferably further comprises at least one tension-spring-receptor 544, which preferably extends below curved lip 543, for preferably receiving and retaining nut tension-spring 550 (see FIG. 5). Tension-spring-receptor 544 preferably comprises an oval shape with straight sides. Tension-spring-receptor 544 preferably further comprises at least one spring-retention tab 620, preferably at least two spring-tension tabs 620, which protrude outward from the straight sides, for assisting in retaining nut tension-spring 550 on nut assembly 360 (see FIG. 8A).

Referring to FIGS. 8A and 8B, nut tension-spring 550 preferably comprises at least one rounded parallelogram shape which is offset 180 degrees from the parallelogram orientation of nut platform 505 (at least herein embodying wherein said at least one spring comprises a parallelogram) (see FIG. 8A). Nut tension-spring 550 preferably comprises at least one nut engager 560 (see FIG. 5). Nut engager 560 preferably comprises an oval shape cutout. The oval shape cutout preferably comprises straight sides with protruding cutout areas which align with the spring-retention tabs 620 of the tension-spring-receptor 544 of nut assembly 360 (see FIG. 5).

Referring to FIG. 5A, nut tension-spring 550 preferably comprises at least one tension-spring-slope engager 610 on the underside of either end, as shown. Tension-spring-slope engager 610 preferably comprises a "dew drop" shaped protrusion for engaging channel-spring slope 420 upon insertion of the nut assembly 360 into nut channel 350 of mounting-rail 310, as discussed below.

Referring to FIGS. 6, 8A and 8B, nut platform 505 comprises a height F of about ⅛ inch (See FIG. 6). Nut platform 505 comprises a length H of about ⅜ inch (See FIG. 8B). Nut-interlock aligner 580 preferably comprises a width D which is equal to width D of about 1/32 inch of nut-locking groove 430 of mounting-rail 310 (see FIG. 4). Screw-chamfer collar 570 preferably comprises a height C which is equal to height C of nut-locking groove 430 of mounting-rail 310 as seen in FIG. 6.

Referring to FIG. 7A, this view of nut assembly 360 with nut tension-spring 550 attached, more clearly depicts nut-interlock aligners 580, the protrusion of screw-chamfer collar 570, collared surface 530 and the clockwise threading 546 of fastener-receptor 542, as shown.

Figure 9:
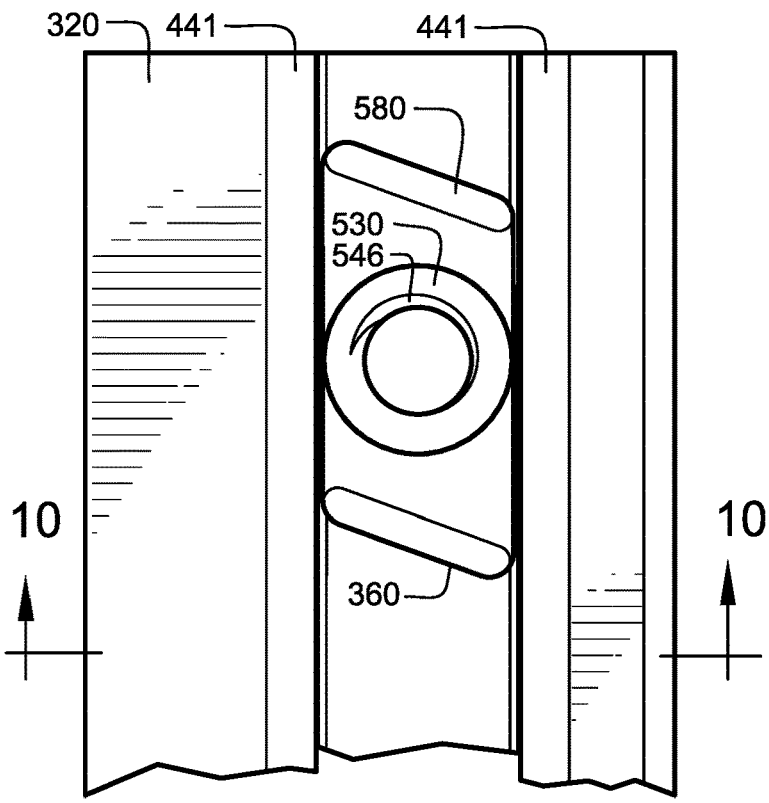
FIG. 9 shows a partial top view of the mounting rail with the nut assembly inserted in an unlocked position, according to the preferred embodiment of FIG. 3.

FIG. 9 shows a partial top view of the mounting-rail 310 with the nut assembly 360 inserted in an unlocked position, according to the preferred embodiment of FIG. 3. In order to install component equipment, a rack must preferably be built using mounting-rail 310 and nut assembly 360. Nut assembly 360 is preferably structured and arranged to fit into mounting-rail 310 through width A of the opening of nut channel 350. Nut assembly 360 can preferably be placed into mounting-rail 310 at any desired position along continuous-channel opening 322.

Figure 10:
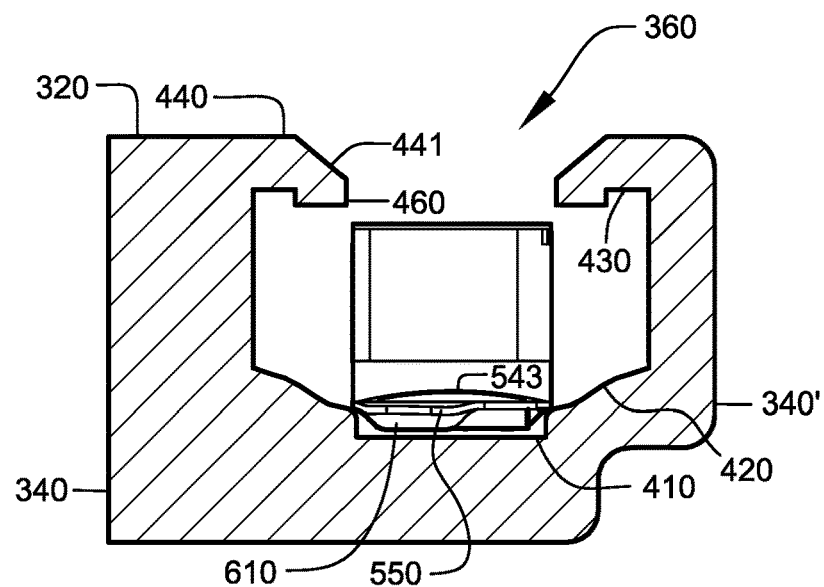
FIG. 10 shows the sectional view 10-10 of FIG. 9 according to the preferred embodiment of FIG. 3.

FIG. 10 shows the sectional view 10-10 of FIG. 9 according to the preferred embodiment of FIG. 3. When inserted through the at least one opening of nut channel 350, nut assembly 360 will preferably drop down into nut channel 350 until the bottom surface 592 of nut platform 505 rests on the edge of spring slope 420, nut tension-spring 550 rests inside nut groove 410 and nut-interlock aligners 580 are situate slightly below the ends of retaining flange 440, as shown.

FIG. 11 shows the sectional view 11-11 of FIG. 12 of the mounting-rail with the nut inserted in the locked position, according to the preferred embodiment of FIG. 3. In order to lock nut assembly 360 in place within mounting-rail 310, preferably a locking tool is used. Nut assembly 360 is preferably structured and arranged to lock into place when pressure is preferably placed on nut assembly 360 in a downward motion and nut assembly 360 (at least herein embodying wherein said fastener coupler further comprises at least one rotational engager structured and arranged to engage said at least one mounting-rail by rotation of said at least one fastener coupler; and at least herein embodying wherein said fastener coupler means further comprises rotational engager means for engaging said at least one mounting rail by rotation of said at least one fastener coupler means) is preferably turned in clockwise direction 720 around axis 710, as shown. As nut assembly 360 is preferably turned in clockwise direction 720, tension-spring slope-engager 610 preferably engages spring slope 420 on either side of nut channel 350 (at least herein embodying wherein said at least one frictional-force creator comprises: at least one friction-force sustainer-engager structured and arranged to engage said at least one friction-force sustainer to create a frictional force between said at least one fastener coupler and said at least one mounting-rail). Engagement of tension-spring slope-engager 610 with spring slope 420 preferably causes nut tension-spring 550 to preferably bend in an upward manner along curved lip 543 of fastener-receptor 542, as shown. The bending of nut tension-spring 550 preferably causes nut assembly 360 to push upward as it is turning (at least herein embodying wherein said at least one friction-force sustainer engages said at least one friction-force sustainer-engager upon rotation of said at least one fastener coupler in said at least one mounting rail; and at least herein embodying wherein said at least one friction-force sustainer means engages said at least one friction-force sustainer-engager means upon rotation of said at least one fastener coupler in said at least one mounting rail).

The parallelogram shape of nut platform 505 and the opposite parallelogram shape of nut tension-spring 550 preferably both bias nut assembly 360 to turn in clockwise direction 720; the rounded corners of nut platform 505 and nut tension-spring 550 preferably aid in allowing nut assembly 360 to turn easily. The parallelogram shape of nut assembly 360 and the opposite parallelogram shape of nut tension-spring 550 will also preferably restrict them from the ability to turn in a counter-clockwise direction (Applicant envisions the mirroring of the parallelogram shape should a particular installation require counter-clockwise fasteners).

Once nut assembly 360 is turned less than 90 degrees (at least herein embodying wherein said parallelogram of said at least one fastener coupler restricts said at least one fastener coupler to rotate less than 90 degrees), nut tension-spring 550 has preferably reached the edges of nut channel 350 and the top of spring slope 420. Nut assembly 360 is preferably pushed all the way upward by the upward tensioning of nut tension-spring 550. This upward pushing of nut assembly 360 preferably causes nut-interlock aligner 580 to slide into nut-locking groove 430 thus locking the nut assembly 360 into place (at least herein embodying wherein said rail portion and said fastener-coupler portion interlock to engage said at least one mounting rail and said at least one fastener coupler; and at least herein embodying wherein said rail portion and said fastener-coupler portion interlock to engage coupling between said at least one mounting-rail and said at least one fastener coupler means), as shown. This arrangement embodies herein at least one rail coupler structured and arranged to couple said at least one mounting-rail with said at least one fastener coupler; and this arrangement embodies herein rail coupler means for coupling said at least one mounting-rail with said fastener coupler means.

FIG. 12 shows a partial top view of the mounting-rail with the nut assembly 360 inserted in the locked position, according to the preferred embodiment of FIG. 3. The upward tensioning of nut-tension spring 550 preferably causes the nut to be "locked" in place, when nut assembly 360 and mounting-rail 310 are coupled. Once nut assembly 360 is preferably "locked" into mounting-rail 310, the tension from nut tension-spring 550 preferably maintains the nut in the "locked" position within mounting-rail 310, thus preferably preventing nut assembly 360 from any gravity-induced sliding within mounting-rail 310 prior to the fastener 370 being inserted and tightened (at least herein embodying wherein said at least one fastener coupler further comprises at least one gravity resister structured and arranged to resist gravity-induced sliding of said at least one fastener coupler along said at least one mounting-rail; and at least herein embodying wherein said fastener coupler means further comprises gravity resister means for resisting gravity-induced sliding of said fastener coupler means along said at least one mounting rail).

FIG. 13 shows the sectional view 13-13 of FIG. 12 of the rail with the nut inserted in the locked position, according to the preferred embodiment of FIG. 3. This figure gives a clear view of clockwise threading 546 of fastener-receptor 542, and how nut tension spring 550 bends upward into curved lip 543.

Figure 14:
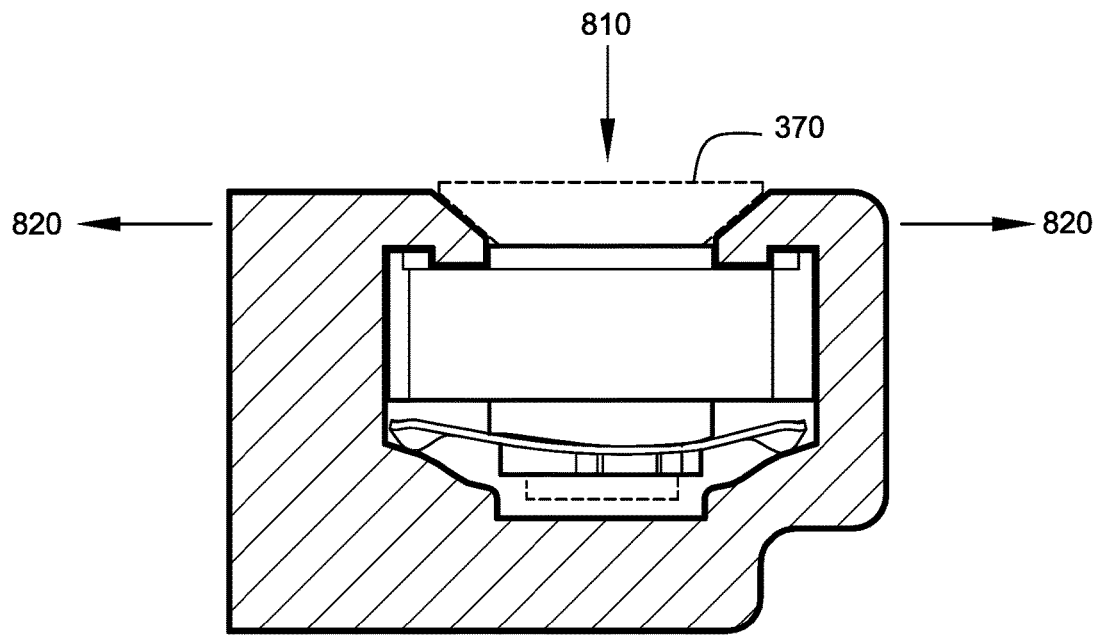
FIG. 14 shows the sectional view 11-11 of FIG. 12 of the rail with the nut in the locked position, according to the preferred embodiment of FIG. 3.

FIG. 14 shows the sectional view 11-11 of FIG. 12 of the rail with the nut in the locked position and a fastener inserted, according to the preferred embodiment of FIG. 3.

While locked in place, the collared surface 530, of nut assembly 360 preferably fully aligns with surface 441 of retaining flange 440. This alignment preferably allows the fastener 370 to engage both retaining flange 440 of mounting-rail 310 and fastener-receptor 542 of nut assembly 360.

Once nut assembly 360 is preferably locked into place within mounting-rail 310, preferably a fastener 370, preferably a screw, can be inserted into fastener-receptor 542 of nut assembly 360. As fastener 370 is turned clockwise in order to tighten it in place, there preferably is a pressure 810 exerted downward into nut assembly 360. In most existing installation systems, this pressure 810 being exerted downward into the nut assembly would cause the outer rails of mounting-rail 310 to spread apart with force 820, as shown. However, in the present invention, although pressure 810 is exerted on nut assembly 360 as fastener 370 is tightened, nut-interlock aligners 580 seated securely within nut-locking groove 430 preferably prevents force 820 from causing mounting-rail 310 to spread apart (at least herein embodying wherein, when such at least one fastener is tightened, such at least one mount exerts at least one spreading force upon said at least one mounting-rail; and at least herein embodying wherein said at least one fastener coupler comprises at least one rail-spread restrictor structured and arranged to restrict spread of said at least one mounting-rail from such at least one spreading force; and at least herein embodying wherein said fastener coupler means comprises rail-spread restrictor means for restricting spread of said at least one mounting-rail from such at least one spreading force).

The interlocking design of both the mounting-rail 310 and nut assembly 360 preferably provides a bridging of the open face of the mounting-rail 310, which preferably creates a box-beam type structure at each/every point of mounting/fastening of the equipment. This arrangement herein embodies wherein said at least one fastener coupler further comprises at least one rail-structural reinforcer structured and arranged to reinforce, when such at least one fastener is tightened, the structural integrity of said at least one mounting-rail; and this arrangement herein embodies wherein, when the structural integrity of said at least one mounting-rail is reinforced by said at least one rail-structural reinforcer, at least one portion of said at least one mounting-rail coupled with said at least one fastener coupler comprises at least one box-beam structure; and this arrangement herein embodies wherein said fastener coupler means further comprises rail-structural reinforcer means for reinforcing, when such at least one fastener is tightened, the structural integrity of said at least one mounting-rail. The strength of the box-beam type structure is therefore preferably located at each point of stress along mounting-rail 310 due to the mounting of equipment. In itself this design allows for less material to be used in the rails (lightening the weight) while still providing one of the strongest mounting structures yet known.

All measurements referenced herein are approximations. A person of reasonable skill in the art is able to appreciate and understand the levels of tolerances which would be appropriate for the referenced measurements.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to mounting multiple components into an equipment panel, comprising:
    a) at least one mounting-rail structured and arranged to mount the components into the equipment panel;
    b) at least one fastener; and
    c) at least one coupler structured and arranged to couple at least one fastener and said at least one mounting-rail;
    d) wherein said at least one fastener and said at least one coupler is structured and arranged to mount the components to said at least one mounting-rail;
    e) wherein said at least one mounting-rail comprises two rail-ends, a rail-back, two rail-sides, and a rail-front defining an interior cavity;
    f) wherein said at least one coupler fits within said interior cavity;
    g) wherein said at least one rail-front comprises
        i) an interior face and an exterior face,
        ii) a channel opening running between said two rail-ends and passing through both said interior face and said exterior face, and
        iii) two grooves running adjacent said channel on said interior face on opposite sides of said channel;
    h) wherein said at least one fastener couples with said at least one coupler through said channel opening;
    i) wherein said channel comprises chamfered edges defining a mounting-seat recessed into said rail-front structured and arranged to seat a mount of the components;
    j) wherein, when said at least one fastener is tightened, said at least one fastener presses such mount into said mounting-seat and against said chamfered edges exerting at least one spreading force upon said chamfered edges of said channel of said rail-front of said at least one mounting-rail;
    k) wherein said at least one coupler comprises
        i) at least two tabs structured and arranged to interlock with said two grooves on said interior face of said rail-front,
        ii) wherein said at least two tabs are on opposite ends of said at least one coupler,
        iii) wherein, when said at least two tabs interlock with said two grooves, said at least one coupler bridges said channel and restricts the distance available to said chamfered edges to spread; wherein said at least one coupler further comprises a shape only allowing a directional rotation of said at least one coupler in one direction to position said at least two tabs to interlock with said two grooves; and
    l) wherein, when said at least one fastener couples with said at least one coupler through said channel opening and when said at least two tabs interlock with said two grooves, said at least one mounting-rail is structured and arranged to permit sliding of said at least one fastener and said at least one coupler together along said at least one mounting-rail continuously between both ends.

2. The system according to claim 1 wherein said at least one coupler further comprises
    a) a coupler-length greater than coupler-width;
    b) wherein said coupler-width is less than the width of said channel;
    c) wherein said at least one coupler is insertable into said internal cavity through said channel.

3. The system according to claim 1 wherein said at least one coupler further comprises at least one spring; and wherein, when said at least one coupler is in said interior cavity and when said at least two tabs interlock with said two grooves, said at least one spring engages said interior cavity at said rail-back pressing said at least two tabs into said two grooves.

4. The system according to claim 1 wherein said rail-back comprises:
a) at least one slope located in said internal cavity;
b) wherein said at least one slope reduces the distance between said rail-back and said rail-front in said internal cavity as said at least one slope progresses toward one of said two rail-sides;
c) wherein said at least one spring increases in applied force as said at least one coupler inserted into said internal cavity through said channel is rotated to align said at least two tabs with said two grooves.

5. The system according to claim 3 wherein said at least one spring comprises a parallelogram shape.

6. The system according to claim 1 wherein said directional rotation only allowed by said shape of said at least one coupler is clockwise rotation.

7. The system according to claim 6 wherein said shape of said at least one coupler comprises a parallelogram.

8. The system according to claim 7 wherein said parallelogram of said at least one coupler restricts said at least one coupler to rotate less than 90 degrees.

9. The system according to claim 8 wherein said chamfered edges chamfer comprise a 100 degree chamfer.

10. A system, relating to mounting components into an equipment panel, comprising:
a) at least one mounting-rail structured and arranged to mount the components into the equipment panel;
b) at least one fastener; and
c) at least one nut structured and arranged to couple at least one fastener and said at least one mounting-rail;
d) wherein said at least one fastener and said at least one nut is structured and arranged to mount the components to said at least one mounting-rail;
e) wherein said at least one mounting-rail comprises two rail-ends, a rail-back, two rail-sides, and a rail-front defining an interior cavity;
f) wherein said at least one nut fits within said interior cavity;
g) wherein said at least one rail-front comprises
  i) an interior face and an exterior face,
  ii) a channel opening running between said two rail-ends and passing through both said interior face and said exterior face, and
  iii) two grooves running adjacent said channel on said interior face on opposite sides of said channel;
h) wherein said at least one fastener couples with said at least one nut through said channel opening;
i) wherein said channel comprises chamfered edges defining a mounting-seat recessed into said rail-front structured and arranged to seat a mount of the components;
j) wherein, as said at least one fastener is tightened, said at least one fastener presses such mount into said mounting-seat and against said chamfered edges exerting at least one spreading force upon said chamfered edges of said channel of said rail-front of said at least one mounting-rail;
k) wherein said at least one nut comprises
  i) at least two tabs structured and arranged to interlock with said two grooves on said interior face of said rail-front,
  ii) wherein said at least two tabs are on opposite ends of said at least one nut,
  iii) wherein, when said at least two tabs interlock with said two grooves, said at least one nut bridges said channel and restricts the distance available to said chamfered edges to spread; and
l) wherein, when said at least one fastener couples with said at least one nut through said channel opening and when said at least two tabs interlock with said two grooves, said at least one mounting-rail is structured and arranged to permit sliding of said at least one nut and said at least one fastener together along said at least one mounting-rail continuously between both ends;
m) wherein said at least one nut further comprises at least one spring;
n) wherein, when said at least one nut is in said interior cavity and when said at least two tabs interlock with said two grooves, said at least one spring engages said interior cavity at said rail-back pressing said at least two tabs into said two grooves;
o) wherein said rail-back comprises at least one slope located in said internal cavity;
p) wherein said at least one slope reduces the distance between said rail-back and said rail-front in said internal cavity as said at least one slope progresses toward one of said two rail-sides;
q) wherein said at least one spring increases in applied force as said at least one nut inserted into said internal cavity through said channel is rotated to align said at least two tabs with said two grooves;
r) wherein said at least one nut further comprises a shape only allowing a directional rotation of said at least one nut in one direction to position said at least two tabs to interlock with said two grooves;
s)
t) wherein said directional rotation only allowed by said shape of said at least one nut is clockwise rotation;
u)
v)
w)
x)
y)
z) wherein said at least one nut reinforces, when such at least one fastener is tightened, the structural integrity of said at least one mounting-rail; and
aa) wherein, when the structural integrity of said at least one mounting-rail is reinforced by said at least one nut, at least one portion of said at least one mounting-rail at said at least one nut comprises at least one box-beam structure.

\* \* \* \* \*